United States Patent Office
2,884,300
Patented Apr. 28, 1959

2,884,300

DYEING SYNTHETIC FIBRES WITH THIOXANTHONES

Willy Braun, Heidelberg, Otto Trauth, Ludwigshafen (Rhine), and Egon Von Gross, Ludwigshafen (Rhine), Oppau, Germany, assignors to Badische Anilin- & Soda-Fabrik Aktiengesellschaft, Ludwigshafen (Rhine), Germany No Drawing. Application April 26, 1956
Serial No. 580,961

8 Claims. (Cl. 8—55)

This invention relates to a process of dyeing synthetic fibres.

We have found that synthetic fibres, such as acetyl cellulose or polyacrylonitrile, polyamides, polyurethanes, polyesters and copolymers of acrylonitrile can be dyed very fast clear yellow to orange-red shades of very good color strength by treating them with aqueous dispersions of 1-aminobenzophenone sulfones of the general formula:

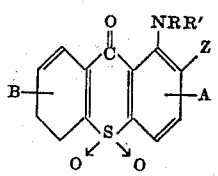

in which R and R' represent hydrogen or identical or different alkyl, hydroxyalkyl, cycloalkyl, aralkyl or aryl radicals or are members of a common saturated ring, Z represents hydrogen, a lower alkyl, an acyl, a carboxylic acid or an ester group, and A and B represent hydrogen, lower alkyl or alkoxy or nitro groups or halogen atoms. 1 - aminobenzophenone - sulfones containing carboxylic groups can best be used if the fibres have been pretreated with so-called "animalizing" agents, as for example the reaction product of 2 mols of acrylonitrile on 1 mol of p.p'-diaminodicyclohexylmethane.

1-aminobenzophenone-sulfones which are suitable for the process according to the present invention are obtainable for example by first oxidizing 1-halogenthioxanthones (the preparation of which is described in Berichte der Deutschen Chemischen Gesellschaft, volume 42 (1909), page 3060, or volume 49 (1916), page 2487), by known methods for example by means of hydrogen peroxide in acetic acid solution, to the 1-halogenthioxanthone-sulfones (=1-halogenbenzophenone-sulfones) and then reacting the halogen atom with ammonia or with a primary or secondary amine, for example by the method described in the latter of the above literature references.

Suitable amines are, for example, mono- and dimethylamine, the propyl- and butylamines, mono- and dihydroxylethylamine, cyclopentyl, cyclohexyl and dicyclohexylamine, benzylamine, aniline, N-hydroxyethylaniline, the toluidines, aminobenzoic acid and its lower alkyl esters, pyrrolidine, piperidine and morpholine.

Other 1-aminobenzophenone sulfones suitable for the present process can be obtained by nitrating 2-alkylbenzophenone-sulfones converting the resultant 1-nitro-2-alkyl-benzophenone-sulfones into the corresponding isoxazole derivatives and reducing the latter in an acid medium, which reactions may be represented by the following scheme:

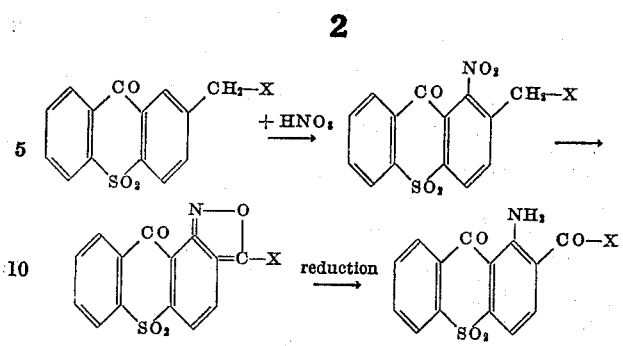

In these formulae X represents hydrogen or alkyl, aralkyl, aryl or cycloalkyl groups. In this way the corresponding 1-aminobenzophenone-sulfone-2-aldehydes (X=H) or -ketones (X=alkyl, aralkyl, aryl, or cycloalkyl) may be obtained. If the initial material is not, as above formulated, an unsubstituted 2-alkylbenzophenone-sulfone, but a substitution product, as for example an alkyl, halogen, nitro and/or alkylsulfonyl derivative, the corresponding substituted 1-aminobenzophenone-sulfone-2-aldehydes or -ketones are obtained.

The nitration is effected in the usual way, as for example with nitrating acid or by the introduction of nitric acid or nitrates, such as potassium or sodium nitrate, into the solution or suspension of the 2-alkylbenzophenone-sulfone in 96% sulfuric acid or in monohydrate. At room temperature or only moderately elevated temperature, in general only one nitro group enters, and indeed into the position 1 adjacent to the CO-group; at higher temperatures further nitro groups may enter.

The working up of the nitration mixture is effected by dilution with water; the yields are very good throughout. By recrystallization, the nitro compounds are obtained in analytically pure form; in some cases a separation into isomeric dinitro compounds thereby takes place.

To convert the 1-nitro-2-alkylbenzophenone-sulfones into the isoxazole derivatives, they are treated with oleum of about 60 to 65% $SO_3$-content at temperatures between about 0° and 10° C.

The isoxazoles are then treated in acid medium with reducing agents, such as ferrous sulfate. In this way there are formed in very good yields the 1-aminobenzophenone-sulfone-2-aldehydes or -ketones. If the isoxazole derivative also contains further reducible groups, as for example nitro groups, these may also be reduced.

Further 1-aminobenzophenone-sulfones suitable for the present dyeing process can be obtained by nitrating a 2-methylbenzophenone-sulfone, converting the resultant 1-nitro-2-methylbenzophenone-sulfone isoxazole derivative and reacting the latter with water or with an organic hydroxy compound, preferably in alkaline or acid medium, which reactions may be represented by the following scheme:

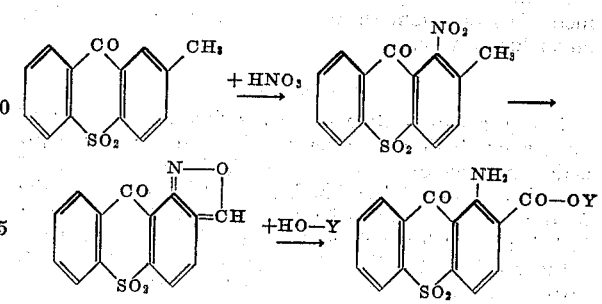

In these formulae Y represents hydrogen or an alkyl, aryl, aralkyl or cycloalkyl group. In this way there are obtained the corresponding 1-aminobenzophenone-sulfone carboxylic acids (when Y is H) or their esters (when Y is alkyl, cyclo-alkyl, aralkyl or aryl). If the initial material is not, as above formulated the unsubstituted 2-methylbenzophenone-sulfone, but one of its substitution products, as for example its alkyl, halogen, nitro and/or alkyl sulfonyl derivatives, the corresponding substituted 1-aminobenzophenone-sulfone-2-carboxylic acids or their esters are obtained. The esters may naturally also be prepared by subsequent esterification of the carboxylic acids in conventional manner, for example by way of the acid chlorides or isatoic acid anhydrides.

The nitration is effected in conventional manner, for example with nitrating acid or by introduction of nitric acid or nitrates, such as potassium or sodium nitrate, into a solution or suspension of the 2-methylbenzophenone-sulfone in 96% sulfuric acid or in monohydrate. At room or moderately elevated temperatures, generally speaking only one nitro group is introduced, and indeed into the position 1 adjacent the CO-group; at higher temperatures, further nitro groups may be introduced.

The working up of the nitration mixture is carried out by dilution with water; the yields are very good throughout. The nitro compounds are obtained in analytically pure form by recrystallization; a separation into isomeric dinitro compounds also thereby takes place in some cases.

In order to convert the 1-nitro-2-methyl-benzophenone-sulfones into the isoxazole derivatives, they are treated with oleum of about 60 to 65% $SO_3$-content at temperatures between about 0° and 10° C.

The isoxazoles are then heated, for example with dilute aqueous caustic alkali solution until complete dissolution has taken place. By acidifying the resultant solution, the 1-amino-benzophenone-sulfone-2-carboxylic acid formed is precipitated. It forms directly when the isoxazole, if desired in a solvent or diluent, is heated with dilute mineral acids. When the isoxazole derivatives are heated with aliphatic, cyclo-aliphatic, araliphatic or aromatic hydroxy compounds, such as methanol, ethanol, butanol, benzyl alcohol, cyclohexanol or phenol, with the addition of small amounts of alkaline agents, such as potassium cyanide, the corresponding esters are obtained.

The following examples will further illustrate this invention but the invention is not restricted to these examples.

*Example 1*

100 grams of acetate fibres are moved for an hour at 75° C. in 4 litres of water to which have been added 10 ccs. of a 50% solution of Marseilles soap and 1 gram of finely divided 1-amino-4-methylbenzophenone-sulfone. The fibres are rinsed and finished off in the usual way. The resultant clear yellow dyeing of good color strength shows very good fastness properties.

The 1-amino-4-methylbenzophenone-sulfone used is obtainable from 1-chlor-4-methylthioxanthone by oxidation with glacial acetic acid and hydrogen peroxide and reaction of the resultant sulfone with ammonia.

A similar dyeing is obtained with 1-methyl-amino-4-methylbenzophenone-sulfone which can be prepared in an analogous way.

*Example 2*

100 grams of acetate fibres are first pretreated with an aqueous bath containing per liter 1 gram of the reaction product of 2 mols of acrylonitrile on 1 mol of p.p'-diamino-dicyclohexylmethane. After rinsing, the fibrous material is dyed by moving it for 30 minutes at 75° C. in a bath which contains 20 ccs. of concentrated sulfuric acid and 1 gram of 1-(ortho-carboxyphenylamino)-4-methylbenzophenone-sulfone in 5 litres of water.

The 1-(ortho-carboxyphenylamino)-4-methyl-benzophenone-sulfone is obtainable by the process described in Berichte der Deutschen Chemischen Gesellschaft, volume 49 (1916), page 2510, by reaction of 1-chlor-4-methylbenzophenone-sulfone with ortho-aminobenzoic acid.

*Example 3*

100 grams of polyamide fabric are dyed for 90 minutes at 90° to 95° C. in 4 litres of an aqueous bath which contains 1 gram of finely divided 1-(N-beta-hydroxyethyl)-amino-benzophenone-sulfone, 8 ccs. of 25% aqueous ammonia solution, 8 grams of ammonium sulfate and 3 ccs. of the reaction product of sperm oil alcohol with about 24 mols of ethylene oxide. A powerful clear golden-yellow dyeing of excellent fastness is obtained.

The aminobenzophenone derivative used may be prepared from 1-chlorthioxanthone by oxidation with glacial acetic acid and hydrogen peroxide and reaction of the resultant 1-chlorbenzophenone-sulfone with ethanolamine.

Similar fast, but orange-red, dyeings are obtained with 1-hydroxyethylamino-2-methyl-4-methoxybenzophenone-sulfone which can be prepared in analogous manner from 1-chlor-2-methyl-4-methoxy-thioxanthone (cf. Berichte der Deutschen Chemischen Gesellschaft, volume 49 (1916), page 2504), by oxidation with hydrogen peroxide in acetic acid solution and subsequent reaction with ethanolamine.

*Example 4*

The dyestuff specified in the last paragraph of Example 3 is used for dyeing acetate fibres in the way described in Example 1. A powerful, fast orange-red dyeing is also obtained thereby.

*Example 5*

100 grams of a fabric of polyterephthalic acid glycol ester are dyed for about 2 hours in a boiling bath which contains 1 gram of finely divided 1-amino-4-ethyl-benzophenone-sulfone in 4 litres of water. The fabric is dyed intense yellow. The dyeing has very good fastness properties and in particular has excellent fastness to light.

The 1-amino-4-ethylbenzophenone-sulfone used may be prepared from 1-chlor-4-ethylthioxanthone (cf. J. Am. Chem. Soc. 74 (1952), page 4296), by oxidation with glacial acetic acid and hydrogen peroxide and reaction of the resultant sulfone with ammonia.

The 1-aminobenzophenone-sulfone derivatives specified in Examples 1 and 3 can also be used in a similar way for dyeing polyester fabrics, yellow or orange-red dyeings of excellent fastness being obtained.

*Example 6*

The 1-amino-4-ethylbenzophenone-sulfone prepared as described in paragraph 2 of Example 5 is used for dyeing acetate fibres according to the method of working in Example 1. A very fast, clear yellow dyeing is obtained.

Polyamide or polyurethane fibre can also be dyed an extremely fast yellow in an analogous way with this dyestuff according to the method of operation in Example 3.

*Example 7*

100 grams of polyacrylonitrile fabric are treated for 90 minutes at 100° C. in 4 litres of water which contain 2 grams of 1-amino-4-methylbenzophenone-sulfone in finely divided form and 2 grams of di-isobutylnaphthalene-sulfonic acid sodium salt. A powerful yellow dyeing of very good fastness is obtained.

*Example 8*

26.5 parts of potassium nitrate are introduced in portions while stirring at 0° to 5° C. into a solution of 30 parts of 2-methylbenzophenone-sulfone (prepared in known manner by condensing thio- or dithio-salicylic acid with toluene in concentrated sulfuric acid to form 2-methylthioxanthone and oxidation of the latter with hydrogen peroxide in glacial acetic acid or with an alkali metal persulfate in concentrated sulfuric acid) in 360 parts of concentrated sulfuric acid. The whole is stirred for about 6 hours at 20° to 25° C., then poured onto ice, filtered by suction, washed and dried. By recrystallization from chlorbenzene, the 1-nitro-2-methylbenzophenonesulfone is obtained as colorless crystals of the melting point 265° to 266° C.

4 parts of this nitro compound are stirred in portions under carbon dioxide at 0° to 10° C. into 80 parts of 60% oleum. After about 30 minutes it is poured onto ice, washed neutral and dried. The isoxazole derivative obtained in a good yield forms a yellow powder which after recrystallization from ortho-dichlorbenzene melts at 238° to 239° C.

Into a solution of 2 parts of the resultant isoxazole derivative in 65 parts of concentrated sulfuric acid there is gradually allowed to flow at 20° to 30° C. while stirring a solution of 5.2 parts of crystallized ferrous sulfate in 20 parts of water. The whole is stirred for 2 to 3 hours further at 80° C., then poured onto ice and the precipitate filtered off by suction, washed neutral and dried. The 1-amino-benzophenone-sulfone-2-aldehyde forms, after recrystallization from nitrobenzene, yellow crystals of the melting point 312° to 315° C.

The dyestuff thus obtained when dyed by the method described in Example 1 on acetate fibres gives a clear yellow dyeing of good fastness properties.

Example 9

37 parts of 2-ethylbenzophenone-sulfone (prepared in known manner by condensing thio- or dithio-salicylic acid with ethylbenzene and oxidation of the resultant 2-ethylthioxanthone with hydrogen peroxide in glacial acetic acid or a persulfate in sulfuric acid) are dissolved in 680 parts of concentrated sulfuric acid and nitrated at 20° to 25° C. by adding in portions 22 parts of potassium nitrate and stirring for 5 to 6 hours. The nitro compound thereby precipitates in part. It is completely precipitated by dilution with ice water, filtered off by suction, washed neutral and dried.

15 parts of the 1-nitro-2-ethylbenzophenone-sulfone thus obtained are introduced at 0° to 10° C. under carbon dioxide into 300 parts of 60% oleum. After further stirring for an hour, it is diluted with 550 parts of 90% sulfuric acid, then poured onto ice and the isoxazole derivative is filtered off by suction, washed and dried.

Into a solution of 12.5 parts of this methylisoxazole in 900 parts of concentrated sulfuric acid there is gradually allowed to flow at 20° to 30° C. while stirring and cooling a solution of 40 parts of crystallized ferrous sulfate in 150 parts of water. The whole is stirred for another 2 to 3 hours at 80° C. and then the 1-amino-2-acetylbenzophenone-sulfone formed is precipitated with ice, filtered off by suction, washed and dried. After recrystallization from dimethylformamide, it is obtained in the form of yellow crystals of the melting point 292° to 294° C. The yield is practically quantitative.

The dyestuff thus obtained when dyed by the method described in Example 1 gives clear yellow shades of good fastness properties.

Example 10

5 parts of the 1-nitro-2-methylbenzophenone-sulfone prepared according to Example 8, paragraph 1, are stirred at 70° C. to 75° C. for 8 to 10 hours with 45 parts of nitrating acid ($H_2SO_4$:$HNO_3$=49:51). The precipitated crystal pulp is then filtered off by suction and washed neutral. The dinitro derivative thus obtained melts, after drying, at 336° C. By diluting the filtrate with water, an isomeric dinitro compound of the melting point 240° to 242° C. is precipitated.

5 parts of the dinitro compound of higher melting point are stirred under carbon dioxide at 0° to 10° C. into 120 parts of 65% oleum. It is stirred for about 30 minutes further at about 10° C. and then diluted first with 220 parts of 90% sulfuric acid and then poured finally onto ice. The yellow x-nitrobenzophenone-sulfone-i(N).2-isoxazole thus obtained melts at 250° to 251° C. (with decomposition).

By reduction of this isoxazole with ferrous sulfate as in Example 1, 3.7 parts of 1-amino-x-nitrobenzophenone-sulfone-2-aldehyde are obtained as a golden-yellow powder of the melting point 240° to 241° C.

The dyestuff thus obtained when dyed on polyamide fibres according to Example 3 gives clear golden-yellow dyeings of good fastness properties.

From the dinitro compound of lower melting point (see paragraph 1 of this example) there are obtained by analogous treatment first the isoxazole derivative of the decomposition point 250° to 254° C. and then the isomeric 1-amino-x-nitrobenzophenone-sulfone-2-aldehyde of the melting point 230° to 231° C. This dyestuff gives, when dyed on polyamide fibres, similar shades.

Example 11

26.5 parts of potassium nitrate are introduced at 0° to 5° C. in portions while stirring into a solution of 30 parts of 2-methyl-benzophenone-sulfone (prepared in conventional manner by condensation of thio- or dithiosalicyclic acid with toluene in concentrated sulfuric acid to form the 2-methylthioxanthone and oxidation of the latter with hydrogen peroxide in glacial acetic acid or with a persulfate in concentrated sulfuric acid) in 360 parts of concentrated sulfuric acid. The whole is stirred for about 6 hours at 20° to 25° C., then poured onto ice, filtered by suction, washed and dried. By recrystallization from chlorbenzene, 1-nitro-2-methyl-benzophenone-sulfone is obtained as colorless crystals of the melting point 265° to 266° C.

4 parts of this nitro compound are stirred under carbon dioxide at 0° to 0° C. in portions into 80 parts of 60% oleum. After about 30 minutes it is poured onto ice, washed neutral and dried. The isoxazole derivative obtained in a good yield forms a yellow powder which after recrystallization from orthodichlorbenzene melts at 238° to 239° C.

A suspension of 4 parts of the isoxazole derivative in 30 times its weight of 2 to 5% caustic soda solution is gradually heated to boiling and boiled under reflux until all has dissolved. The dark brown solution is then acidified with hydrochloric acid, and the precipitated 1-aminobenzophenone-sulfone-2-carboxylic acid is filtered off by suction, washed and dried. It forms a brown-yellow, alkali-soluble powder of the melting point 287° to 289° C.

The dyestuff thus obtained when dyed on acetate fibres according to the process described in Example 2 gives very strong yellow dyeings of good fastness properties.

Example 12

4 parts of the isoxazole derivative prepared according to Example 11, paragraphs 1 and 2, are boiled under reflux for 2 to 3 hours with 2 parts of potassium cyanide and 40 parts of absolute ethanol. After cooling, the 1-amino-benzophenone-sulfone-2-carboxylic acid ethyl ester crystallizes in the form of yellow prisms. It melts at 230° to 231° C. and gives a red color reaction in concentrated sulfuric acid with formaldehyde.

Using normal butanol instead of ethanol, the normal butyl ester having the melting point 115° to 116° C. is obtained. The ester group-containing dyestuffs thus obtained give very clear, strong greenish-yellow dyeings on polyterephthalic acid glycol ester, polyamide, polyurethane, acetate and polyacrylonitrile fibres and on fibres from copolymers of acrylonitrile with acrylic acid esters, maleic acid esters and methacrylic acid esters when dyed by the methods described in the foregoing examples.

Example 13

10 parts of the 1-aminobenzophenone-sulfone-2-carboxylic acid prepared according to Example 11, paragraphs 1, 2 and 3, are treated with phosgene in 100 parts of nitrobenzene for 24 hours at 90° to 120° C. The resultant isatoic acid anhydride derivative crystallizes in the cold in sand-colored needles of the melting point 295° to 300° C. (with decomposition).

5 parts of this isatoic acid anhydride derivative are boiled under reflux with 100 parts of ethylene glycol for a short time. From the filtered yellow-brown solution, the glycol ester crystallizes in the cold in an almost quantitative yield in the form of yellow prisms of the melting point 216° to 217° C.

The dyestuff thus obtained gives very clear, strong greenish-yellow dyeings of good fastness properties when dyed on acetate, polyacrylonitrile, polyamide and polyterephthalic acid glycol ester fibres by the methods described in the foregoing examples.

Example 14

5 parts of the 1-nitro-2-methylbenzophenone-sulfone prepared according to Example 11, paragraph 1, are stirred with 45 parts of nitrating acid $$(H_2SO_4 : HNO_3 = 49 : 51)$$

for 8 to 10 hours at 70° to 75° C. The precipitated crystal pulp is then filtered off by suction and washed neutral. The dinitro derivative melts, after drying, at 336° C. By dilution of the filtrate with water, an isomeric dinitro compound having the melting point 240° to 242° C. is precipitated.

4 parts of the dinitro compound of higher melting point are stirred into 120 parts of 60% oleum at 0° to 10° C. under carbon dioxide. It is stirred for about 30 minutes longer at about 10° C. and is then diluted first with 220 parts of 90% sulfuric acid and then poured onto ice. The yellow x - nitrobenzophenone - sulfone - 1 - (N).2-isoazole thus obtained melts at 250° to 251° C. (with decomposition).

3 parts of this isoxazole derivative are heated with about 120 parts of 5% caustic soda solution on a waterbath until all has dissolved and then the x-nitro-1-aminobenzo-phenone-sulfone-2-carboxylic acid is precipitated from the clear red-brown solution with hydrochloric acid. It is washed neutral with ice water. After drying it forms a red-brown powder having the decomposition point 248° to 249° C.

From the dinitro compound of lower boiling point (see paragraph 1 of this example) there is obtained in an analogous manner, by way of the yellow isoxazole derivative having the decomposition point 250° to 254° C., the isomeric x-nitro-1-aminobenzophenone-sulfone-2-carboxylic acid.

The two isomeric dyestuffs thus obtained or their crude mixture are dyed by the method described in Example 2 on acetate fibres pretreated with the reaction product of 2 mols of acrylonitrile on 1 mol of p.p′-diaminodicyclohexylmethane. There are obtained golden-yellow dyeings of good fastness properties.

We claim:

1. Synthetic fibres selected from the group consisting of acetyl cellulose, polyamide, polyurethane, polyterephthalic acid glycol ester and fibers from acrylonitrile polymers dyed with an aqueous dispersion of an 1-aminobenzophenone sulfone of the general formula

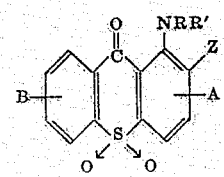

in which NRR′ represents the radical of a member of the class consisting of ammonia, lower primary and secondary lower alkyl, cycloalkyl, hydroxyalkyl, benzyl and aryl amines of the benzene series, Z represents a member of the class consisting of hydrogen, lower alkyl, formyl, acetyl, carboxylic and carboxylic acid lower alkyl ester groups, and A and B represent members of the class consisting of hydrogen, lower alkyl and alkoxy groups and nitro groups.

2. Synthetic fibres selected from the group consisting of acetyl cellulose, polyamide, polyurethane, polyterephthalic acid glycol ester and fibers from acrylonitrile polymers dyed with an aqueous dispersion of a dyestuff of the formula

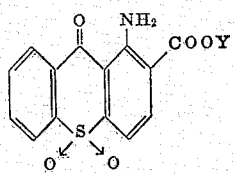

wherein Y represents a member of the class consisting of hydrogen, lower alkyl, aryl, aralkyl and cycloalkyl groups and an ethylene radical combined with a second 1-aminobenzophenone-sulfone-2-carboxylic acid group.

3. Synthetic fibres selected from the group consisting of acetyl cellulose, polyamide, polyurethane, polyterephthalic acid glycol ester and fibers from acrylonitrile polymers dyed with an aqueous dispersion of a dyestuff of the formula

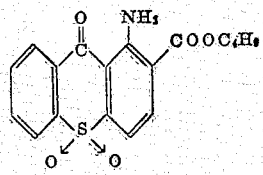

4. Synthetic fibres selected from the group consisting of acetyl cellulose, polyamide, polyurethane, polyterephthalic acid glycol ester and fibers from acrylonitrile polymers dyed with an aqueous dispersion of a dyestuff of the formula

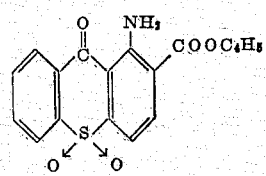

5. Synthetic fibres selected from the group consisting of acetyl cellulose, polyamide, polyurethane, polyterephthalic acid glycol ester and fibres from acrylonitrile polymers dyed with an aqueous dispersion of an 1-aminobenzophenone sulfone of the general formula

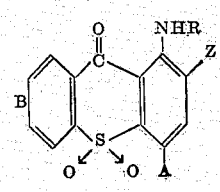

in which R represents a member of the class consisting of hydrogen, methyl, carboxyphenyl and hydroxyalkyl groups, Z represents a member of the class consisting of hydrogen, methyl, formyl, acetyl, carboxylic and carboxylic acid lower alkyl ester groups, A represents a member of the class consisting of hydrogen, methyl, ethyl and methoxyl groups and B represents a member of the class consisting of hydrogen and a nitro group.

6. Synthetic fibres selected from the group consisting of acetyl cellulose, polyamide, polyurethane, polyterephthalic acid glycol ester and fibres from acrylonitrile polymers dyed with an aqueous dispersion of a dyestuff of the formula

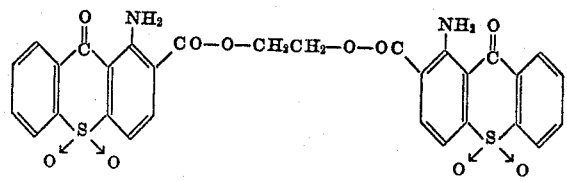

7. Synthetic fibres selected from the group consisting of acetyl cellulose, polyamide, polyurethane, polyterephthalic acid glycol ester and fibres from acrylonitrile polymers dyed with an aqueous dispersion of a dyestuff of the general formula

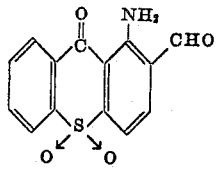

8. Synthetic fibres selected from the group consisting of acetyl cellulose, polyamide, polyurethane, polyterephthalic acid glycol ester and fibres from acrylonitrile polymers dyed with an aqueous dispersion of a dyestuff of the formula

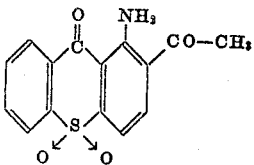

References Cited in the file of this patent

UNITED STATES PATENTS

| | | |
|---|---|---|
| 2,311,065 | McNally | Feb. 16, 1943 |
| 2,428,758 | Max et al. | Oct. 7, 1947 |
| 2,649,460 | Delbert | Aug. 18, 1953 |

UNITED STATES PATENT OFFICE
CERTIFICATE OF CORRECTION

Patent No. 2,884,300                                    April 28, 1959

Willy Braun et al.

It is hereby certified that error appears in the printed specification of the above numbered patent requiring correction and that the said Letters Patent should read as corrected below.

Column 6, line 34, for "$0°$ to $0°$ C." read -- $0°$ to $10°$ C. --; column 7, line 35, for "isoazole" read -- isoxazole --.

Signed and sealed this 21st day of June 1960.

(SEAL)
Attest:

KARL H. AXLINE
Attesting Officer

ROBERT C. WATSON
Commissioner of Patents